United States Patent [19]
Sato et al.

[11] 3,975,657
[45] Aug. 17, 1976

[54] METHOD OF AND APPARATUS FOR CONTROLLING AMOUNT OF ELECTRON BEAM IN IMAGE PICKUP TUBE

[75] Inventors: Kazuhiro Sato, Tokyo; Shizuka Ishibashi; Yoshizumi Eto, both of Hachioji, all of Japan

[73] Assignees: Hitachi, Ltd.; Hitachi Electronics Co., Ltd., both of Japan

[22] Filed: Mar. 7, 1974

[21] Appl. No.: 449,108

[30] Foreign Application Priority Data
Mar. 9, 1973   Japan.............................. 48-27039

[52] U.S. Cl. .................................................. 315/10
[51] Int. Cl.² ...................................... H01J 31/26
[58] Field of Search.............. 315/10, 11, 12, 135 T, 315/30, 31 R

[56] References Cited
UNITED STATES PATENTS

| | | |
|---|---|---|
| 2,833,957 | 5/1958 | Horowitz ............................. 315/10 |
| 2,930,929 | 3/1960 | Shelton ............................... 315/10 |
| 3,440,476 | 4/1969 | Crowell et al. ....................... 315/10 |
| 3,617,801 | 11/1971 | Hogan .................................. 315/11 |
| 3,629,499 | 12/1971 | Carlson ................................ 315/10 |
| 3,646,390 | 2/1972 | Silver et al. ......................... 315/11 |

Primary Examiner—Malcolm F. Hubler
Assistant Examiner—T. M. Blum
Attorney, Agent, or Firm—Craig & Antonelli

[57] ABSTRACT

A method of and an apparatus for controlling the amount of the electron beam in a photoconduction type image pickup tube in which the signal corresponding to the return beam from the photoelectric conversion plane is detected, the detected signal is compared with a reference signal and amplified, and the resulting signal is applied to the scanning electron beam current control electrode. By appropriately determining a plurality of circuit constants the return beam can be maintained approximately at a constant value independently of the amount of light incident upon the photoelectric conversion plane.

16 Claims, 6 Drawing Figures

METHOD OF AND APPARATUS FOR CONTROLLING AMOUNT OF ELECTRON BEAM IN IMAGE PICKUP TUBE

The present invention relates to a method of and an apparatus for controlling the amount of an electron beam to provide a proper beam current always in response to the variation in the amount of light incident upon a photoconduction type image pick-up tube.

Generally in a photoconduction type image pick-up tube such as a vidicon or a plumbicon the amount of the electron beam which scans the photoelectric conversion plane of the pickup tube is restricted in relation to the resolution. This is because the focussing state of the electron beam reaching the photoelectric conversion plane deteriorates with the increase in the amount of the beam. Consequently, the higher resolution is required for the television camera, the more severely the amount of the electron beam is restricted. However, when an image pickup tube with such a restricted electron beam is used for an object having as its part a glittering part or body such as a lamp or a metallic reflection, it is impossible to neutralize the electric charge stored at the part of the photoelectric conversion plane corresponding to the glittering part of the object with one scanning with an electron beam, causing a beam shortage phenomenon. As a result, a so-called white crunch appears on the picture which results in an after image when the television camera moves. Because of this phenomenon a photoconduction type image pickup tube such as a vidicon or plumbicon is not suitable for photographing of an object having a high contrast ratio such as an outdoor photographing.

As a solution to the problem of the prior art photoconduction type image pickup tube there is known a method in which the voltage corresponding to the signal current is applied to the beam control electrode of the image pickup tube to increase the amount of the beam at the bright part so that the insufficiency of the amount of the beam is moderated without deteriorating the resolution at the dark part. However, as will be described in more detail below, this method is poor in stability, and hence is not practical.

An object of the present invention is to provide a method of controlling the amount of the electron beam in a photoconduction type image pickup tube capable of providing a proper beam current depending on the amount of light incident upon the photoelectric conversion plane, or in other words, capable of expanding the range of the treatable contrast.

Another object of the present invention is to provide an apparatus for practising the above method.

According to one aspect of the present invention there is provided a method of controlling the amount of the electron beam in a photoconduction type image pickup tube characterized in that the amount of the scanning electron beam is controlled by a signal corresponding to the return beam from the photoelectric conversion plane.

According to another aspect of the present invention there is provided an apparatus for controlling the amount of the electron beam in a photoconduction type image pickup tube characterized by means for detecting a signal corresponding to the return beam from the photoelectric conversion plane, means for deriving a scanning electron beam amount controlling signal from the output signal of the detecting means and a reference signal, and means for applying the output signal of the deriving means to the scanning electron beam amount controlling electrode.

The amount of the "return beam" $I_R$ is defined as the amount of beam corresponding to the difference $I_B - I_S$ between the amount $I_B$ of the beam current directed to the photoelectric conversion plane and the signal current $I_S$ derived from the photoelectric conversion plane to the outside. The control is made such that the amount of beam current $I_B$ always satisfies the relation $I_B > I_S$ and that the amount of return beam $I_R$ is detected directly or indirectly so that when the detected output (hereinafter referred to as the signal corresponding to the return beam) decreases, the amount of beam current $I_B$ is increased to produce always substantially a constant $I_R$ independently of the amount of light incident upon the photoelectric conversion plane.

By controlling the amount of the beam current $I_B$ as above, the present invention can overcome the disadvantage of a prior art photoconduction type image pickup tube that the dynamic range is so narrow that an object having a large contrast ratio cannot be photographed while reducing the deterioration of the resolution to a minimum. The disadvantage of a prior art method of controlling the amount of electron beam it is unstable and oscillation is liable to occur can also be overcome.

The above and other objects, features and advantages of the present invention will become more apparent from the following detailed description of the preferred embodiments of the present invention when taken in conjunction with the accompanying drawings, in which.

Figure 1:
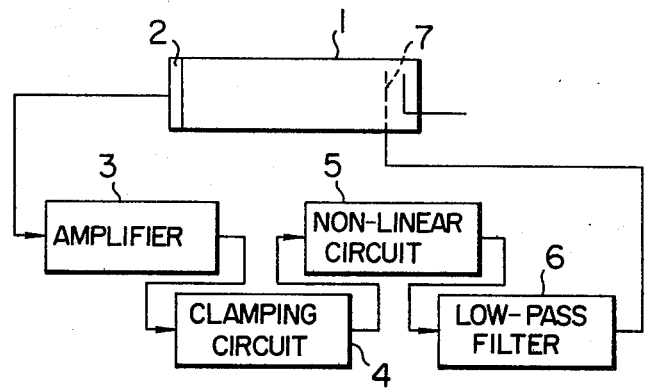
FIG. 1 is a block diagram of a system for performing a prior art method of overcoming the beam insufficiency of a photoconduction type image pickup tube.
Figure 2:
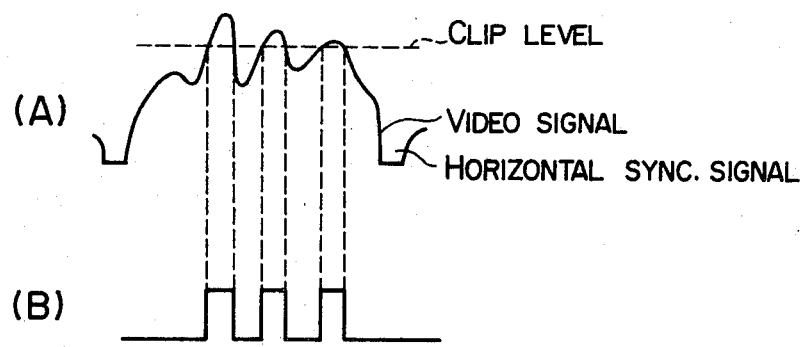
FIG. 2 is a wave diagram of the image signal (A) produced by the system of FIG. 1 and the pulse waveform (B) formed from the image signal (A)

First a prior art method will be described briefly referring to FIG. 1. The signal derived from the target electrode 2 of an image pickup tube 1, the waveform of which is shown at (A) in FIG. 2, is amplified by an amplifier 3 and, after the DC level is fixed by a clamping circuit 4, only the signal for the bright part higher than a predetermined clipping level is derived by a non-linear circuit 5. The derived signal is converted into a pulse waveform as shown at (B) in FIG. 2 and, after being passed through a lowpass filter 6 for oscillation prevention, supplied to the beam current control electrode 7 of the image pickup tube 1 superimposingly on a DC bias voltage ordinarily applied thereto to form a feedback circuit. Then, the system operates such that the beam current increases only at the part of the photoelectric conversion plane at which the amount of incident light is abundant. Thus, the beam insufficiency phenomenon can be obviated.

However, since the pulse waveform is applied to the beam current control electrode 7, harmonic components of the pulse waveform step in the other electrodes inside the image pickup tube 1 to mix in the output signal. For this reason, the low-pass filter 6 is provided to attenuate the harmonic components of the pulse waveform, which, however, causes the difficulty that the phase of the pulse is delayed to destroy the correspondence to the image of an object. On the other hand, if, eliminating the non-linear circuit 5, only the signal for the bright part of the object is amplified appropriately and supplied to the beam current control electrode 7, the beam current at the bright part, i.e. the high signal current part increases, so that the circuit operates to derive a higher signal current. Thus, the system becomes a positive feedback circuit giving rise to oscillation. Consequently, this method is very poor in stability.

Figure 3:
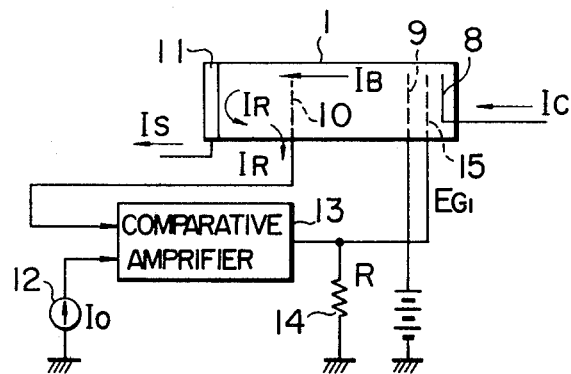
FIG. 3 is an embodiment of the present invention.

An embodiment of the present invention will now be described referring to FIGS. 3 and 4. In the following analysis the mesh electrode (not shown) provided in front of the photoelectric conversion plane is not taken into consideration for the sake of simplicity, but the following analysis stands similarly even if the mesh electrode is present.

The cathode current $I_C$ sent off in the image pickup tube 1 from the cathode 8 is accelerated by the accelerating electrode 9 after being controlled by the control voltage $E_{G1}$ applied to the control electrode 15. The greater part of this current $I_C$ is absorbed by the accelerating electrode 9, but a part thereof becomes a scanning beam current $I_B$ and runs toward the photoelectric conversion plane 11. By appropriately determining the amount of the scanning beam current $I_B$ the greater part thereof is absorbed by the photoelectric conversion plane 11 to be derived therefrom as a signal current $I_S$. However, a certain amount of electrons is not be absorbed and flow back toward the acceleration electrode 9 as a return beam current $I_R$.

The return beam is collected by a return beam detecting electrode 10 specially provided between the photoelectric conversion plane 11 and the acceleration electrode 9 and subtracted from the current $I_0$ from a reference current source 12 by a comparative amplifier 13. The result is preferably amplified, subjected to voltage conversion by a resistor 14, and supplied to the beam current control electrode 15. In other words, the voltage based on the reference current $I_0$ corresponds to the DC bias voltage applied to the beam current control electrode of a prior art picture pickup tube, and the voltage component based on the return beam current $I_R$ is superposed thereon as a difference. Here, it is unnecessary to take into consideration the current flowing directly from the cathode 8 into the return beam detecting electrode 10. This is because it is possible to detect only the return beam current to reduce the directly flowing-in current to a quite negligible amount by making the return beam detecting electrode 10 in an appropriate configuration. The circuit constructed as above is a negative feedback circuit for which the following three equations stand:

$$A(I_0 - I_R) = \frac{E_{G1}}{R} \quad (1)$$

$$E_{G1} = \frac{1}{g_m} \cdot I_C \quad (2)$$

$$I_B = I_R + I_S \quad (3)$$

where A is the amplification factor of the comparative amplifier 13, $I_C$ is the cathode current, R is the resistance of the resistor 14, $E_{G1}$ is the voltage on the beam current control electrode, and $g_m$ is the transconductance.

It has been found by the Inventors that the following fourth equation stands between the cathode current $I_C$ and the scanning beam current $I_B$:

$$I_B = \frac{1}{\alpha} \cdot I_C \quad (4)$$

where $\alpha$ is a proportionality constant.

From the above four equations the return beam current $I_R$ can be obtained as follows:

$$I_R = \frac{A \cdot R \cdot g_m}{\alpha + A \cdot R \cdot g_m} I_0 - \frac{\alpha}{\alpha + A \cdot R \cdot g_m} I_S \quad (5)$$

Figure 4:
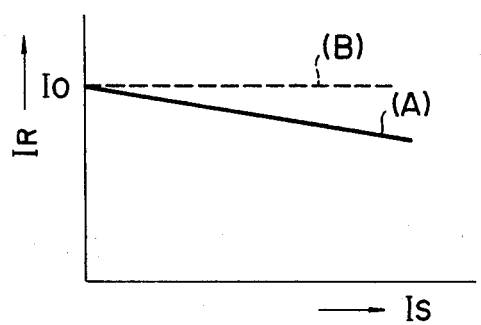
FIG. 4 is a diagram of the return beam controlled by the system of FIG. 3.

Equation (5) represents a straight line as shown at (A) in FIG. 4. On the other hand, since the signal current $I_S$ has a certain finite maximum value $I_{SM}$ determined by the property of the image pickup tube, if the relation $\alpha << A.R.g_m$ stands, and moreover, R.A is determined such that $$\frac{\alpha \cdot I_{SM}}{\alpha + A \cdot R \cdot g_m}$$

becomes sufficiently small, the return beam current $I_R$ can be allowed to approach the constant value $I_0$. The straight line (B) in FIG. 4 shows its limit value. Incidentally, in setting the reference current $I_0$ the response time of the feedback circuit and the resolution of the image pickup tube must be taken into consideration. Ordinarily, it may be well to select the reference current $I_0$ at 10 to 30 % of the standard signal current of the image pickup tube (generally 0.3 $\mu$A).

As is apparent from the above description, if the system is constructed such that the return beam from the photoelectric conversion plane is detected and the detected signal is supplied to the beam current control electrode to adjust the bias voltage for the beam current control, it is possible to allow the return beam always to approach a constant value even if the brightness of the object varies, that is, it is possible to supply a sufficient scanning beam current whatever brightness the object may have. Thus, the dynamic range of the image pickup tube can be greatly expanded while reducing the deterioration of the resolution and the beam insufficiency phenomenon can be greatly improved. Also, since the system is a negative feedback circuit, the operation is stable.

As described above, in FIG. 3 which illustrates an example of the fundamental construction of the present invention the input to the comparative amplifier 13 is represented by the current and the output therefrom is subjected to voltage conversion by way of description. However, the signal may be converted from the form of current to the form of voltage.

In the above embodiment the amount of the return beam is detected directly. However, the beam current can be controlled also by detecting the return beam indirectly. This is the method in which the signal corresponding to the return beam from the photoelectric conversion plane can be produced by linearly coupling the cathode current $I_C$ and the signal current $I_S$.

If $I_B$ is eliminated from equations (3) and (4), the following equation results:

$$I_R = \frac{1}{\alpha} \cdot I_C - I_S \quad (6)$$

This equation means that the current equal to the return beam current $I_R$ can be obtained by multiplying the cathode current $I_C$ by $1/\alpha$ and by subtracting the signal current $I_S$ therefrom. That is, the signal equivalent to the return beam current $I_R$ can be obtained by deriving $$\frac{1}{\alpha} \cdot I_C$$

from the cathode of the image pickup tube 1 by means of a shunt circuit or the like and subtracting therefrom the signal current $I_S$ derived from the target electrode 11. By supplying this signal to the comparative amplifier 13 and by supplying the output of the amplifier 13 to the beam current control electrode the fundamental principle of the present invention can be realized. In this case, the return beam detecting electrode is of course unnecessary which alleviates the cost of the system.

In the above description the control is effected by the current. However, generally the voltage amplifier is easier to handle than the current amplifier. Consequently, the return beam current $I_R$ may be converted into a voltage signal through a resistor before it is supplied to the comparative amplifier 13 in FIG. 3, may be compared with the reference voltage $V_O$ and may be amplified by the comparative amplifier 13, and the output signal thereof may be supplied to the beam current control electrode 15. However, since this embodiment requires the return beam current detecting electrode 10, the cost is slightly more expensive.

Instead of the use of the return beam detecting electrode the return beam current can be detected through the acceleration electrode 9 or the mesh electrode disposed right in front of the photoelectric conversion plane. Of course, in this case, it will be needless to say that the subtraction of the current flowing from the cathode directly into the acceleration electrode or the mesh electrode must be made. However, since the mesh electrode is supplied with a high voltage so that the noise mixed in the signal increases. Thus, the AC base impedance must be reduced so that it is difficult to handle. Also, the detection through the acceleration electrode is difficult because the current flowing from the cathode directly into the acceleration electrode is more than 1000 times the return beam current.

The more preferred embodiments of the present invention will be described referring to FIGS. 5 and 6.

Figure 5:
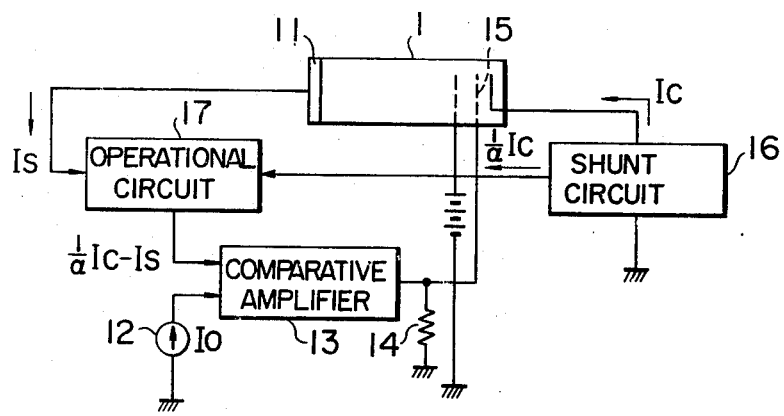
FIGS. 5 and 6 are other embodiments of the present invention.

Referring to FIG. 5, $$\frac{1}{\alpha} \cdot I_C$$

is derived from the cathode of the image pickup tube 1 through a shunt circuit 16 to produce the difference signal $$\frac{1}{\alpha} \cdot I_C - I_S$$

at an operational circuit 17 with the signal current $I_S$ derived from the target electrode 11. This difference signal is the return beam current $I_R$ itself as is evident by comparing with equation (6). Consequently, it is sufficient to compare the output of the operational circuit 17 with the reference current $I_O$ and to amplify it by the comparative amplifier 13, to convert it into a voltage through the resistor 14, and to supply it to the beam current control electrode 15.

Figure 6:
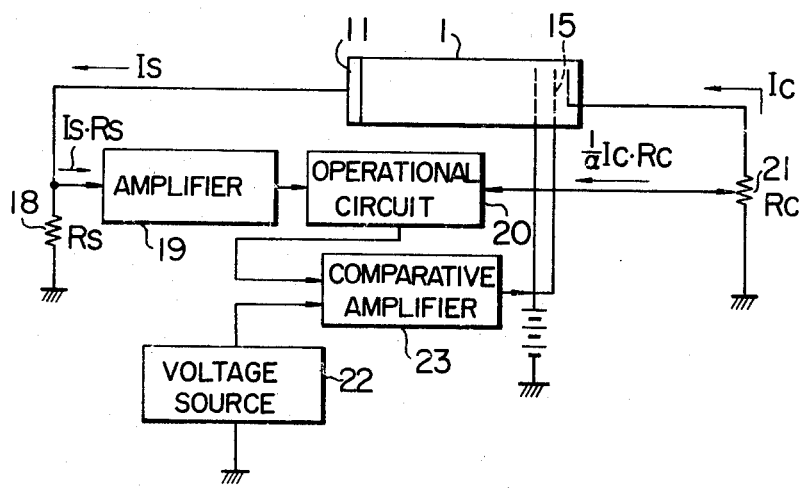

The circuit of FIG. 6 is based on a similar idea as that of FIG. 5. A variable load resistor 21 is connected to the cathode of the image pickup tube 1 to derive the voltage signal $(1/\alpha)I_C \cdot R_C$ from the center point thereof. On the other hand, the signal current $I_S$ derived from the target electrode 11 is amplified by a preamplifier composed of a load resistor 18 and an amplifier 19 (the amplification factor is B) to be converted into the voltage signal $B \cdot R_S \cdot I_S$. The operational circuit 20 produces the difference signal $$\frac{1}{\alpha} \cdot R_C \cdot I_C - R_S \cdot B \cdot I_S$$

between them. In this case, if it is assumed that the relation $R_C = R_S \cdot B = R_O$ ($R_O$ is a constant) stands, the signal produced by the operational amplifier 20 becomes $$\frac{1}{\alpha} \cdot R_O \cdot I_C - R_O \cdot I_S$$

which is the right-hand member of equation (6) multiplied by the constant $R_O$, that is, the voltage signal corresponding to the return beam current $I_R$. On the other hand, since the value of the constant $R_O$ can be easily realized by appropriately determining the load resistance $R_S$ of the signal current $I_S$, the amplification factor B of the amplifier 19, and the resistance $R_C$ of the variable resistor 21, the circuit of FIG. 6 can perform all the same operation as that of the circuit of FIG. 5.

It is needless to say that in these embodiments such a conventionally practised technique that the signal corresponding to the return beam is passed through a clamping circuit in order to fix the DC component thereof before it is supplied to the comparative amplifier can be applied.

What we claim is:

1. In a photoconduction type image pickup tube having a return beam defined to be the difference between a scanning beam current emitted from a cathode and radiated on a photoelectric conversion target and a signal current derived from the outside of said photoelectric conversion target, a method of controlling said tube comprising the steps of generating a signal which, under any operating condition of the tube, is proportional to said return beam from the photoelectric conversion target of the image tube and controlling the amount of the scanning electron beam in accordance with said generated signal.

2. In a photoconduction type image pickup tube having a return beam defined to be the difference between a scanning beam current emitted from a cathode and radiated on a photoelectric conversion target and a signal current derived from the outside of said photoelectric conversion target, a method of controlling said tube comprising the steps of generating a signal which, under any operating condition of the tube, is proportional to said return beam from the photoelectric conversion plane in the pickup tube and controlling the amount of the scanning electron beam such that the return beam is maintained at a constant value.

3. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising means for detecting the return beam from the photoelectric conversion plane of said pickup tube under any operating condition of the tube, means responsive to the output of said detecting means and a reference signal for generating a beam amount controlling signal, and means for applying said beam amount controlling signal to the beam amount controlling electrode of said pickup tube.

4. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising first means for generating a signal which, under any operating condition of the tube, is proportional to said return beam from the photoelectric conversion plane of said pickup tube, second means for comparing the output signal of said first means with a reference signal, and third means for applying the output signal of said second means to the scanning electron beam amount control electrode of said pickup tube, the circuit constants of said first, second, and third means being determined such that the return beam always holds a predetermined value.

5. An apparatus according to claim 4, characterized in that said first means for detecting the signal which, under any operating condition of the tube, is proportional to said return beam is an electrode disposed between the mesh electrode and the acceleration electrode of the pickup tube.

6. An apparatus according to claim 4, characterized in that said first means for detecting the signal which, under any operating condition of the tube, is proportional to said return beam is the mesh electrode.

7. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising first means for generating a signal which, under any operating condition of the tube, is proportional to said return beam of the pickup tube in response to the signal from the target electrode of the pickup tube and the signal from the cathode of the pickup tube, second means for comparing the output signal of said first means with a reference signal, and third means for applying the output signal of said second means to the scanning electron beam amount control electrode of said pickup tube.

8. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising first means for generating a signal which, under any operating condition of the tube, is proportional to said return beam of the pickup tube in response to the signal from the target electrode of the pickup tube and the signal from the cathode of the pickup tube, second means for deriving a scanning electron beam amount control signal from the output signal of said first means and a reference signal, and third means for applying the output signal of said second means to the scanning electron beam amount control electrode of said pickup tube, the circuit constants of said first, second, and third means being determined such that the return beam always holds a predetermined value.

9. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising first means for deriving a signal proportional to the cathode current of said pickup tube, second means responsive to the output signal of said first means and the output signal of the target electrode of said pickup tube for producing a signal which, under any operating condition of the tube, is proportional to said return beam from the photoelectric conversion plane of said pickup tube, third means for comparing the output signal of said second means with a reference signal, and fourth means for applying the output signal of said third means to the scanning electron beam amount control electrode of said pickup tube, the circuit constants of said first, second, third, and fourth means being determined such that the return beam always holds a predetermined value.

10. In a photoconduction type image pickup tube having a return beam defined to be the difference between a scanning beam current emitted from a cathode and radiated on a photoelectric conversion target and a signal current derived from the outside of said photoelectric coversion target, an apparatus for controlling said tube comprising first means for converting the output signal of the target electrode into a voltage signal, second means connected to the cathode of said pickup tube for producing a voltage signal proportional to the cathode current, third means responsive to the output signals of said first and second means for producing a signal which, under any operating condition of the tube, is proportional to said return beam from the photoelectric conversion plane of said pickup tube, fourth means for generating a scanning electron beam amount control signal from the output signal of said third means and a reference voltage signal, and fifth means for applying the output of said fourth means to the scanning electron beam amount control electrode of said pickup tube, the circuit constants of said first, second, third, fourth, and fifth means being determined such that the return beam always holds a predetermined value.

11. An apparatus according to claim 10, characterized in that said second means for detecting the voltage signal proportional to the cathode current is a variable resistor.

12. In a photoconduction type image pickup tube having a return beam defined to be the difference between a scanning beam current emitted from a cathode and radiated on a photoelectric conversion target and a signal current derived from the outside of said photoelectric conversion target, an apparatus for controlling said tube comprising first means for producing a signal which, under any operating condition of the tube, is proportional to said return beam of the image pickup tube, second means for generating a difference signal corresponding to the difference between the signal produced by said first means and a predetermined reference signal, and third means responsive to said difference signal for controlling the amount of the electron beam of the image pickup tube in a direction to reduce the difference signal.

13. An apparatus according to claim 12, characterized in that said first means is an electrode disposed between the photoelectric conversion plane of the image pickup tube and the control electrode of the image pickup tube.

14. An apparatus according to claim 13, characterized in that said first means is a return beam detecting electrode disposed between the mesh electrode positioned right in front of the photoelectric conversion plane of the image pickup tube and the beam acceleration electrode of the image pickup tube.

15. A method of controlling the amount of the electron beam in a vidicon-type pickup tube comprising the steps of obtaining a difference signal which, under any operating condition of the tube, corresponds to the difference between the amount of the electron beam radiated on the photoelectric conversion surface of the pickup tube and the output signal current derived from said photoelectric conversion surface, and decreasing and increasing the amount of the electron beam according to the value of said difference signal.

16. A method of controlling the amount of the electron beam in a vidicon-type image pickup tube comprising the steps of obtaining a difference signal which, under any operating condition of the tube corresponds to the difference between the amount of the electron beam radiated on the photoelectric conversion surface of the pickup tube and the output signal current derived from said photoelectric conversion surface, and controlling the amount of the electron beam in such a manner that said difference signal is maintained at a predetermined constant value.

* * * * *